US006792576B1

(12) United States Patent
Chidlovskii

(10) Patent No.: US 6,792,576 B1
(45) Date of Patent: Sep. 14, 2004

(54) SYSTEM AND METHOD OF AUTOMATIC WRAPPER GRAMMAR GENERATION

(75) Inventor: Boris Chidlovskii, Meylan (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/361,496

(22) Filed: Jul. 26, 1999

(51) Int. Cl.[7] .......................... G06F 15/00; G06F 17/00

(52) U.S. Cl. ...................... 715/517; 715/512; 715/513; 715/537

(58) Field of Search ................................. 707/512, 513, 707/517, 537; 715/512, 513, 517, 537

(56) References Cited

U.S. PATENT DOCUMENTS

| | | | | |
|---|---|---|---|---|
| 4,996,642 | A | | 2/1991 | Hey .............................. 705/27 |
| 5,704,017 | A | | 12/1997 | Heckerman et al. ........... 706/12 |
| 5,724,567 | A | | 3/1998 | Rose et al. ...................... 707/2 |
| 5,794,237 | A | | 8/1998 | Gore, Jr. ......................... 707/5 |
| 5,826,258 | A | * | 10/1998 | Gupta et al. .................... 707/4 |
| 6,009,441 | A | * | 12/1999 | Mathieu et al. ............. 707/513 |
| 6,085,198 | A | * | 7/2000 | Skinner et al. ............... 707/101 |
| 6,102,969 | A | * | 8/2000 | Christianson et al. ........ 717/146 |
| 6,266,668 | B1 | * | 7/2001 | Vanderveldt et al. .......... 707/10 |
| 6,304,870 | B1 | * | 10/2001 | Kushmerick et al. .......... 707/10 |
| 6,424,980 | B1 | * | 7/2002 | Iizuka et al. ................. 715/513 |
| 6,442,749 | B1 | * | 8/2002 | Hirao et al. .................. 709/316 |
| 6,473,752 | B1 | * | 10/2002 | Fleming, III .................... 707/4 |

OTHER PUBLICATIONS

Boris Childlovskii, Uwe M. Borghoff and Pierre–Yves Chevalier, Towards Sophisticated Wrapping of Web–based Information Repositories, *Proc. Int'l RIAO '97 Conference*, Montreal, 1997, pp. 123–135.

Naveen Ashish, Craig Knoblock, Wrapper Generation for Semi–structured Internet Sources, Semi–Structure Data Workshop held in conjunction with SIGMOD '97, Tucson, AZ, USA, May 1997, vol. 26, No. 4, pp. 8–15.

Naveen Ashish, Craig A. Knoblock, Semi–automatic Wrapper Generation for Internet Information Sources, Proceedings of the Second IFCIS International Conference on Cooperative Information Systems, COOPIS'97 (CAT. No. 97TB100143), Proceedings of COOPIS 97: 2nd IFCIS Conference on Cooperative Information Systems, Kiawah Island, SC, USA, Jun. 24–27, 1997, pp. 160–169.

Valter Crescenzi, Giansalvatore Mecca, Grammars Have Exceptions, Information Systems, Dec. 1999, Elsevier, UK, vol. 23, No. 8, pp. 539–565.

(List continued on next page.)

*Primary Examiner*—Joseph Feild
*Assistant Examiner*—Almari Yuan
(74) *Attorney, Agent, or Firm*—Jeanneatte Walden

(57) ABSTRACT

A method for generating a wrapper grammar for a file having a structure of a particular format includes providing at least one sample file of the particular format, where the particular format comprises a plurality of string tokens. Each sample file includes a plurality of tokens (data strings) which may be actual data from the document, an HTML tag or some other grammatical separator. The sample file of the particular format is then processed by annotating attributable tokens with a user-defined attribute, such as Author, Title, etc. from a set of attributes to form an annotated sample set. The annotated sample set is then evaluated to determine if wrapper grammar generation is possible, and if it is possible, a wrapper grammar for the files having a structure of the particular format is generated. Preferably, the annotated sample set is evaluated by determining if all attributes in the annotated sample set are distinguishable from one another.

18 Claims, 7 Drawing Sheets

OTHER PUBLICATIONS

Michael Hoding, Ralf Hofestadt, Gunter, Saake, Uwe Scholz, Schema Derivation for WWW Information Sources and Their Integration with Databases in Bioinformatics, Advances in Databases and Information Systems, Second East European Symposium, ADBIS '98. Proceedings, Advances in Databases and Information Systems, Second East European Symposium, ADBIS '98. Proceedings, Poznan, Poland, Sep. 7–10, 1998, pp. 296–304.

Theodore Hong, Visualizing Real Estate Property Information on the Web, Information Visualization, 1999. Proceedings. 1999 IEEE International Conference on London, UK Jul. 14–16, 1999, Los Alamitos, CA, USA, IEEE Comput. Soc. US, Jul. 14, 1999, pp. 182–187.

Gerald Huck, Peter Frankhauser, Karl Aberer, Erich Neubold, Jedi: Extracting and Synthesizing Information from the Web, Proceedings. $3^{rd}$ IFCIS International Conference on Cooperative Information Systems (CAT. No. 98EX122), Proceedings of Third IFCIS Conference on Cooperative Information Systems (COOPIS '98), New York, NY, USA, Aug. 20–22, 1998, pp. 32–41.

Nicholas Kushmerick, Wrapper Induction for Information Extraction, Ph.D. Dissertation, Dept. Computer Science and Engineering, University of Washington, Seattle, WA, 1994, pp. 1–264.

Nicholas Kushmerick, Wrapper Induction for Information Extraction, IJCAI–97. Proceedings of the Fifteenth International Joint Conference on Artificial Intelligence, Proceedings of $15^{th}$ International Joint Conference on Artifical Intelligence. IJCAI 97, Nagoya, Japan, Aug. 23–29, 1997, pp. 729–735.

Nicholas Kushmerick, Wrapper Induction: Efficiency and expressiveness, AAAI'98 Workshop on AI and Information Integration AAAI–98, 1998, pp. 1–8.

Nicholas Kushmerick, Wrapper induction: efficiency and expressiveness, Artificial Intelligence, Apr. 2000, Elsevier, Netherlands, vol. 118, No. 1–2, pp. 15–68.

Ion Muslea, Steve Minton and Craig Knoblock, Stalker: Learning Extraction Rules for Semistructured, Web–based Information Sources, AAAI'98 Workshop on AI and Information Integration, Technical Report WS–98–01, AAAI Press, Menlo Park, CA, 1998, pp. 1–8.

William W. Noah, The Integration of the World Wide Web and Intranet Data Resources, Proceedings of the Thirty–First Hawaii International Conference on System Sciences (CAT. No. 98TB100216), Proceedings of the Thirty–First Hawaii International Conference on System Sciences, Kohala Coast, HI, USA, Jan. 6–9, 1998, vol. 4, pp. 496–501.

* cited by examiner

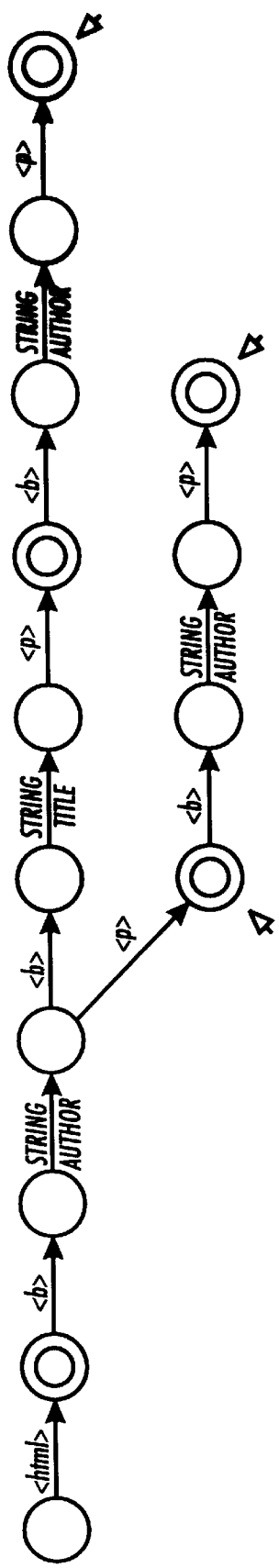
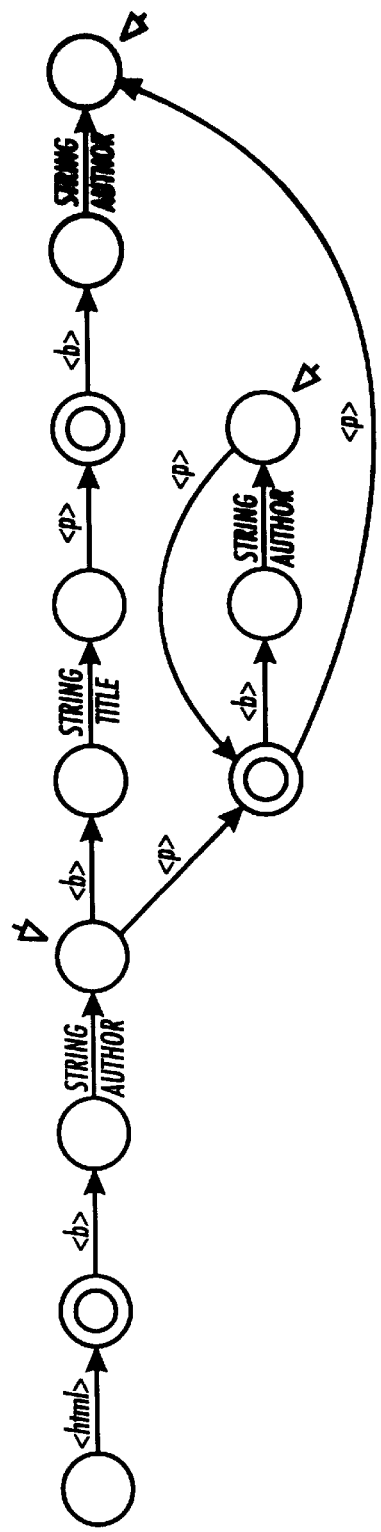
FIG. 6A
FIG. 6B

SYSTEM AND METHOD OF AUTOMATIC WRAPPER GRAMMAR GENERATION

FIELD OF THE INVENTION

This invention relates generally to information retrieval and integration systems, and more particularly, to the creation and generation of wrapper grammars for extracting and regenerating information from documents stored in networked repositories.

BACKGROUND OF THE INVENTION

The World Wide Web (the "web" or "WWW") is an architectural framework for accessing documents (or web pages) stored on a worldwide network of distributed servers called the Internet. An information source is any networked repository, e.g., a corporate database, a WWW site or any other processing service. Documents stored on the Internet are defined as web pages. The architectural framework of the web integrates web pages stored on the Internet using links. Web pages consist of elements that may include text, graphics, images, video and audio. All web pages or documents sent over the Web are prepared using HTML (hypertext markup language) format or structure. An HTML file includes elements describing the document's content as well as numerous markup instructions, which are used to display the document to the user on a display.

Access to online information via the Web is exploding. Search engines must integrate a huge variety of repositories storing this information in heterogeneous formats. While all files sent over the Web are prepared using HTML format, the heterogeneity issue remains both in terms of search query formats and search result formats. Search engines must provide for homogeneous access (to the underlying heterogeneity of the information) and allow for homogenous presentation of the information found.

A wrapper is a type of interface or container that is tied to data; it encapsulates and hides the intricacies of a remote information source in accordance with a set of rules known as a grammar or a wrapper grammar, providing two functions to an information broker. First, wrappers are used to translate a client query to a corresponding one that the remote information source will understand. Wrappers are associated with the particular information source. For example, HTTP wrappers interact with HTTP servers and HTML documents; JDBC wrappers work with ODBC-compliant databases; and DMA wrappers work with DMA-compliant document management systems.

Second, wrappers are used by search engines to extract the information stored in the HTML files representing the individual web pages; the wrapper scans the HTML files returned by the search engine, drops the markup instructions and extracts the information related to the query. If an information broker is involved, the wrapper parses (or processes) the results in a form that can be interpreted and filtered by the information broker. Then the wrapper takes the search answers, either from the different document repositories or from the information broker, puts them in a new format that can be viewed by the user. Extraction and parsing is done in accordance with the grammar or rules for the particular type of response file.

Unfortunately, document repositories and providers HTML' response files are generated for the convenience of visualization rather than information extraction. Moreover, response files from different information providers vary widely both in structure and in format: HTML, ODBC, DMA. Even among HTML providers, the format may vary. For example, some providers may generate HTML tags to separate each attribute of the document (author, title, journal, and date of publication). Other providers may link attributes, such as author and title, together, separating them not by an HTML tag, but by a grammatical separator such as a comma or semicolon.

As a result, the analysis of response files and the creation of wrapper grammars in most search engines require human intervention. As the Web providers evolve over time and as individual documents may change over time, human intervention is also needed each time the response structure or markup is changed. This makes the process of the wrapper grammar creation and maintenance extremely time-consuming and error-prone.

Automatic induction (generation) of wrapper grammars has been studied in the literature. For example, Chidlovskii et al, "Towards Sophisticated Wrapping of Web-based Information Repositories," *Proc. Int'l RIAO'97 Conference*, Montreal, pp. 123–135, 1997, describe a semi-automatic approach for wrapping of Web-based information repositories involving high-level text-processing tools based on grammar rules. While this method allows processing of any regular search result by a high-level grammar, it is not HTML oriented and thus prone to errors or stopping mid-analysis.

N. Kushmerick, *Wrapper Induction for Information Extraction*, Ph.D. Dissertation, Dept. Computer Science and Eng., University of Washington, Seattle, Wash. and *Wrapper Induction; Efficiency and Expressiveness*, AAAI'98 Workshop on AI and Information Integration, AAAI-98, identified some subclasses of HTML wrapper grammars which can be efficiently inferred. These particular subclasses assume a tabular structure of items on the response page. The wrapper grammar inference is therefore reduced to the efficient detection of tag sequences preceding each attribute in such a tabular form.

I. Muslea et al, STALKER: *Learning Extraction Rules for Semistructured, Web-based Information Sources*, AAAI'98 Workshop on AI and Information Integration, 1998 considered a wider set of HTML wrapper grammars. This method goes beyond tables and also induces wrapper grammars in cases when some attributes are missing or their appearance order changes on the response page.

Despite a reported success in about 65% by N. Kushmerick and 75% by I. Muslea et al. of real information providers, both approaches have obvious limitations, for example, in treating disjunction (A or B) and "list of list" or "nested lists" cases.

In addition to the limitations of the above approaches, two main problems affect automatic wrapper grammar generation. The first problem is the ambiguous markup of response pages by some Web-based information providers, which makes automatic wrapper grammar generation difficult at best and in some cases impossible. For example, a Web provider reports a list of answers, with each item containing two string-value attributes $t_1$ and $t_2$, with $t_2$ being optional. Additionally, the provider may use a unique format for each attribute. That is, the HTML file structure of a response page from this Web provider looks as follows: (<i>String ($t_1$)<i> (<i>String ($t_2$)</i>))+. Assume the wrapper grammar has been generated, it has correctly guessed this format and it receives the following response from the provider: <i>string$_1$</i><i>string$_2$</i>. While the wrapper grammar uniquely assigns string$_1$ to attribute $t_1$, recognizing string$_2$ is ambiguous; the wrapper grammar may assign string$_2$ to either attribute $t_1$ or attribute $t_2$ (nondeterministic choice). Clearly, such a behavior is unacceptable for correct attribute extraction and $t_2$ should therefore be excluded during the wrapper grammar generation.

The second main problem in automatically generated wrapper grammars is over-generalization. For example, a grammar like (<HTML>|</HTML>|<body>|</body>| . . . |String)* will accept any HTML file, but it is incapable of properly assigning tokens (or specific values) to the defined user attributes (Title, Author, etc.). Over-generalization originates from a grammar inference mechanism which detects some common fragments in the sample input strings and generalizes them by merging them into a single attribute. Actually, over-generalization is related to inadequate or missing control over merges, which produces a general grammar that extracts more than the allowed for correct attribute.

There is a need for a method of automatic wrapper grammar generation that provides unambiguous attribute assignment. There is a further need for a method of automatic wrapper grammar generation which does not over-generalize fragments of strings into a single attribute. There is also a need for a method of automatic wrapper grammar generation that can generate wrapper grammars from disjunctive cases and list of lists cases. There is a need for a method of automatic wrapper grammar generation that can be used for any information source type format. There is a need for a method of automatic wrapper grammar generation that minimizes the need for human intervention. There is a need for a method of automatic wrapper grammar generation that provides for easy updating of the wrapper grammar when an information source revises its format.

SUMMARY OF THE INVENTION

A method for generating a wrapper grammar for a file having a structure of a particular format, according to the invention, includes providing at least one sample file of the particular format, wherein the particular format comprises a plurality of string tokens. While any particular type format file may be used (such as HTML, JDBC, DMA) with the invention, for convenience, only HTML files will be discussed hereafter. Each sample HTML file includes a plurality of tokens (data strings) which may be actual data from the document, an HTML tag or some other grammatical separator.

The sample file of the particular format is then processed by annotating attributable tokens with attributes from a set of attributes to generate an annotated sample set. A token is attributable if it can be assigned to an attribute. The tokens are, for example, annotated or labeled by assigning a user-defined attribute, such as Author, Title, etc., to those tokens for which such an attribute is defined by an appropriate user.

The annotated sample set is then evaluated to determine if wrapper grammar generation is possible, and if wrapper grammar generation is possible, a wrapper grammar for the files having a structure of the particular format is generated.

Preferably, the annotated sample set is evaluated by determining if all attributes in the annotated sample set are distinguishable from one another. Distinguishability is determined by generating a set of reverse prefixes for each attribute $t_i$, partitioning the attribute set into equivalence classes $d_i$, where no two equivalence classes have common reverse prefixes, and if the equivalence classes are equal to the attributes, $d_i = t_i$, then all attributes $t_i$ are distinguishable and automatic wrapper grammar generation is possible.

The method for generating a wrapper grammar according to the invention overcomes the problems of the manual approach to wrapper grammar generation, eliminating time-consuming and error-prone human intervention. The method for generating a wrapper grammar according to the invention uses techniques from grammatical inference and machine learning and can be used with a much larger class of wrapper grammars than those considered above.

A grammar is a set of rules that together define what may be "spoken" or displayed. In the context of the invention, the wrapper is the interface program that implements the grammar rules. For example, when the wrapper is compiled with a Java compiler compiler, which is a parser generator for use with Java applications, the Java compiler compiler converts the wrapper grammar to a Java program (i.e., the wrapper) that can recognize matches from response pages to the grammar.

A basis for the method of the invention is the assumption that a response page can be covered by a regular grammar. More precisely, a response page is assumed to be covered by a k-reversible regular grammar, where $k \geq 0$. Although the class of reversible grammars is a proper subset of the regular grammar class, the difference between the two classes is minimal so the two can be considered the same for purposes of wrapper grammar generation. Moreover, it can be proven that attribute acceptors induced for the two classes (regular grammars and k-reversible grammars) have the same expressive power. Thus, applying the method of the invention to real Web information providers to generate wrapper grammars based on regular grammars, wrapper grammars are successfully generated nearly 100% of the time.

The method is incremental; it does not require the annotated samples to be necessarily complete, that is, representing all structural elements of the responses. The method is capable of refining the wrapper grammar each time a new HTML response contains a structural element not used in previously processed HTML responses.

The method of wrapper grammar generation according to the invention overcomes the problems of both ambiguity and over-generalization. Ambiguity and over-generalization are eliminated by detecting a proper level of commonness between different fragments of sample strings. Thus the depth of merge operations is determined in such a way that the wrapper grammar generated automatically will accept all strings similar to those in the sample set and, at the same time, will be able to recognize tokens corresponding to use-defined attributes.

Moreover, the method of wrapper grammar generation according to the invention is capable of generating a wrapper grammar in partial cases, i.e., when only some of the user-defined attributes can be distinguished by the automatic grammar generation. In this case, the method provides a partial solution; it merges attributes it cannot recognize into a newly defined joint attribute and then completes the automatic grammar generation. The automatically generated wrapper grammar will recognize the individual attributes, if present, or the joint attribute if present. For example, if user attributes Journal and Volume are not distinguished by the automatic wrapper grammar generation, they can be substituted by a joint attribute called Reference, which will be used in the automatic grammar generation. When the wrapper grammar is used to scan HTML files, if the particular file contains separate tokens for Journal and Volume, they will be found. If only a single token is found, then it will be reported as the attribute Reference.

BRIEF DESCRIPTION OF THE DRAWINGS

FIGS. 6a–6d are graphs of the attribute acceptor A(T) for the sample set $S_T$ given in Example 2.

DETAILED DESCRIPTION OF THE PREFERRED EMBODIMENTS

Figure 1:
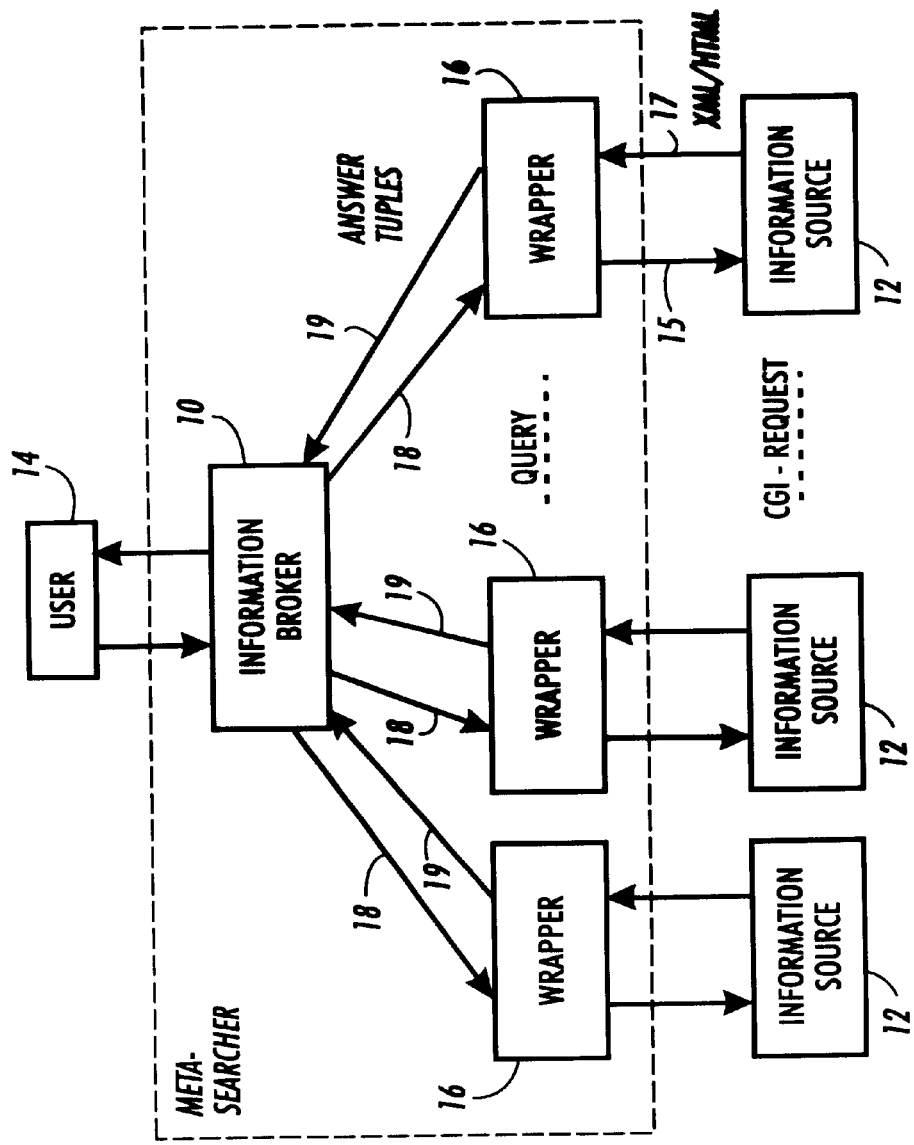
FIG. 1 is a block diagram of an information broker system, which uses different wrappers to transcribe and extract data from a plurality of different information providers.

Referring to FIG. 1, an information broker is shown therein and generally referred to by reference numeral 10. Information broker 10 is a type of search engine that accesses search results from multiple search engines 12, ranks them and presents them to a user or client 14. A wrapper 16 is a type of interface or container that is tied to data; it encapsulates and hides the intricacies of a remote information source in accordance with a set of rules known as a grammar or a wrapper grammar, providing two functions to an information broker 10. First, wrappers are used to translate a client query 18 to a corresponding one the remote information source 12 will understand. Wrappers are associated with the particular information source. For example, HTTP wrappers interact with HTTP servers and HTML documents; JDBC wrappers work with ODBC-compliant databases; and DMA wrappers work with DMA-compliant document management systems. Wrapped queries 15 are submitted via a common gateway interface (CGI) to the various information sources 12, which generate responses 17 in XML or HTML format.

Figure 2:
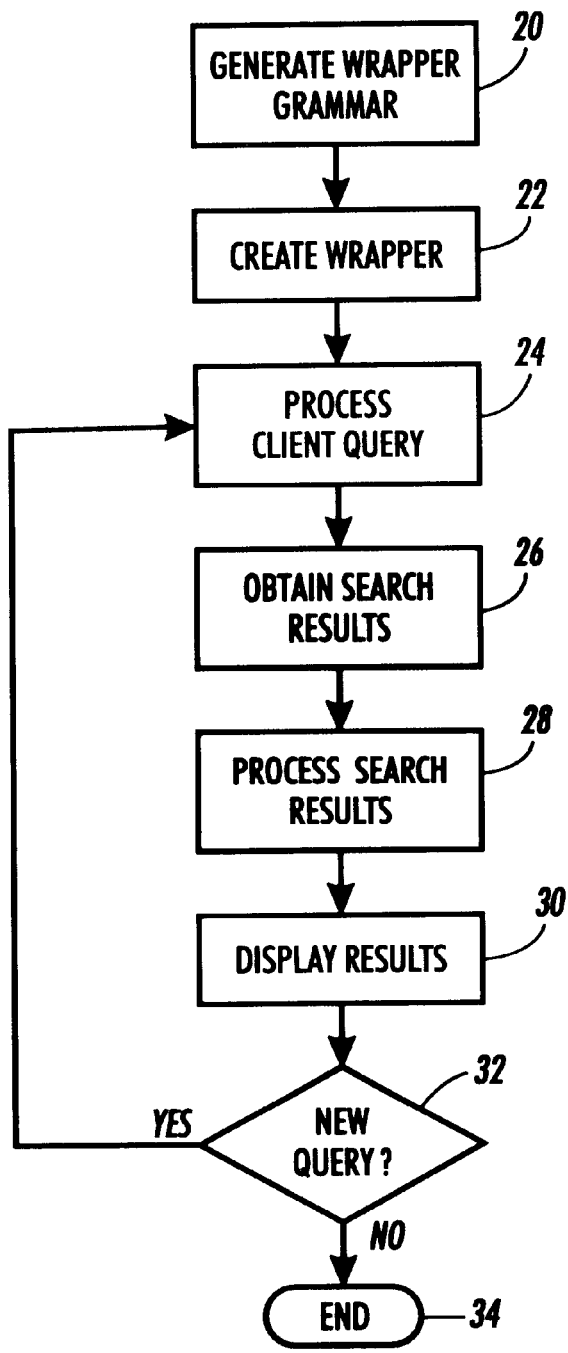
FIG. 2 is a flow chart of an overall method of generating and using a wrapper.

In order for information broker 10 to process results from information sources 12, a separate wrapper 16 must be provided for each information source 12. Referring to FIG. 2, a wrapper grammar must be generated (step 20) and a wrapper created (step 22) for each new information source 12 that information broker 10 intends to submit a client query. Then information source 10 uses the wrapper 16 to process the client query (step 24) to provide the query elements (wrapped query 15) in a form understandable by the information source 12.

When the information source 12 returns the search results 17 (step 26), the wrapper 16 is used to process the results 17 in a form that can be used by the information source 10 (step 28). Wrappers 16 extract the information stored in the HTML files representing the individual web pages. The wrapper 16 scans the HTML files 17 returned by the information source 12, drops the markup instructions and extracts the information related to the query, then parses (or processes) the results in a form that can be interpreted and filtered by the information broker 10. Once processed, the information source 10 then displays the wrapped results 19 to the client (step 30) in a format that can be viewed by the user. Extraction and parsing is done in accordance with the grammar or rules for the particular type of response file. The information source 10 checks for a new query (step 32) and if none, ends (step 34) and if yes, loops back to receive a new query (step 24).

Basic definitions

To aid in understanding the method and system of the invention, certain definitions from the theory of formal languages and grammar learning are provided. The alphabet is a fixed finite nonempty set $\Sigma$ of symbols. A string is a group of symbols (tokens). The set of all finite strings over $\Sigma$ is denoted $\Sigma^*$. $\lambda$ denotes an empty string. For any string w, $|w|$ denotes the length of w and $w^r$ denotes the reverse of w. The concatenation of two strings w and u is denoted wu. The string v is a prefix of the string w if and only if there exists a string u such that vu=w. A language is any subset of $\Sigma^*$. The reverse of a language L is defined by $L^r = \{w^r | w \in L\}$. A positive sample set of the language L is a finite set of strings of L.

An acceptor is a 5-tuple A=($\Sigma$, Q, I, F, $\delta$), such that $\Sigma$ is an alphabet, Q is a finite set, I and F are subsets of Q, and $\delta$ is a map from Q×$\Sigma$ to subsets of Q. Q is the set of states, I is the set of initial states, F is the set of final or accepting states of A, and $\delta$ is the transition function of A. The acceptor is deterministic if and only if there is one initial state, and for each state q$\in$Q and symbol a$\in\Sigma$ there is at most one element in $\delta$(q,a). The transition function $\delta$ may be extended to map a set of states and a string to a set of states in the usual way. If q$\in\delta$(q', a), then q' is called an a-predecessor of q and q is called an a-successor of q'.

A string u is accepted by an acceptor A=($\Sigma$, Q, I, F, $\delta$) if and only if $\delta$(I,u) contains some element of F. The set of strings accepted by A is called the language of A and is denoted L(A).

In an HTML acceptor, the alphabet consists of a predefined set of tokens: HTML tags and Strings (for the contents of the HTML elements), $\Sigma=\{$String,<html>,</html>,<body>,</body>, . . . $\}$. Without loss of generality, we here assume two tag tokens surround one String token (and it can be annotated with one or no user attribute). The case when one HTML String token can be assigned to more that one attribute is considered below.

Let S be a positive sample set of a language L. We define the prefix tree acceptor for S, PT(S)=($\Sigma$,Q, I, F, $\delta$), as follows: Q=Pr( S); I=$\{\lambda\}$; F=S; $\delta$(u,a)=ua, whenever u, ua $\in$Q. PT(S) is a deterministic acceptor that accepts precisely the set S. The inference algorithm for determining if a grammar is k-reversible (defined below) begins with the prefix tree acceptor for S and generalizes it by merging states.

An acceptor, as defined above, either accepts an input string or rejects it. In wrappers, more actions for information extraction are needed than just acceptance or rejection. An attribute acceptor is an acceptor that, beyond accepting or rejecting input strings, also annotates recognized String tokens with certain attributes defined by the user or application. In the following, the user-defined attributes create a list T and the attribute acceptor A(T) can be likened to a wrapper grammar.

An attribute acceptor is a tuple A(T)=($\Sigma$, Q, I, F, T, $\delta$) where $\Sigma$ is an alphabet, Q, I, F are sets of all, initial and final states of A(T), T is an attribute set and $\delta$ is a map from q×$\Sigma$ to Q×T. Informally, any transition rule in $\delta$ of an attribute acceptor is annotated with an attribute t $\in$T. Each time the attribute acceptor consumes the transition rule (q, t)=$\delta$(q', a), the value of String token a (or attributable token a) is assigned to attribute t, such producing the attribute-value pair (t, a.value). Note that a.value is used to distinguish between token a(String) and its value ('XRCE').

To allow transitions without any attribute assignment, a list T with a special attribute void is used each time there is no assignment. Moreover, for practical needs of HTML acceptors, those attributes that can be assigned are separated from those attributes that cannot. A symbol a $\in\Sigma$ is called attributable, if its value can be assigned to an attribute of T. For an HTML acceptor, we assume that only token String and token tag <a> which contains a hyper-link are attributable. Given an attribute list T, an attribute acceptor A(T) is an acceptor A extended with T in such a way that each rule q'=δ(q, a) in δ where a is attributable symbol, is assigned with attributes $t_i \in T$:q,$t_i$=δ(q, a).

Inversely, for an attribute acceptor A(T), its plain acceptor A is an acceptor obtained from A(T) by the removal all attribute annotations from the transition rules. String u is accepted by A(T) if and only if it is accepted by its plain acceptor A. For an accepted string u, the attribute acceptor A(T) produces a labeled sequence G(u) of attribute-value pairs ($t_i$, a.value), where $t_i \in T$ and a∈u.

EXAMPLE 1

Assume an information provider generates responses using an HTML structure which is described by the following regular expression: L=<HTML>(<b>Author (∈|<b>Title)<p>)*, that is, each response starts with the token <HTML> tag followed by a list of 0 or more authors, and each author can be optionally accompanied with a title. An attribute acceptor for L is A(T)=(Σ, Q, I, F, T, δ), where $Q=\{q_1, \ldots, q_6\}$, $I=\{q_0\}$, $F=\{q_1, q_6\}$, T={Author, Title, void)}, and δ={(($q_1$, void)=δ($q_0$,<HTML>), ($q_2$, void)=δ($q_1$,<b>), ($q_3$, Author)=δ($q_2$, String), ($q_4$, void)=δ($q_3$,<b>), ($q_5$, Title)=δ($q_4$, String), ($q_6$, void)=δ($q_5$,<p>), ($q_6$, void)= δ($q_3$,<p>), ($q_2$, void)=δ($q_6$,<b>)}.

Figure 5:
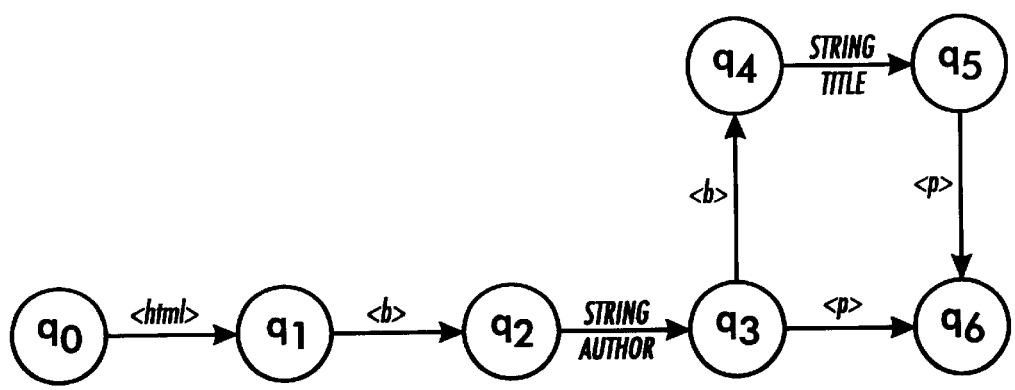
FIG. 5 is a graph of an attribute acceptor A(T) for the sample set $S_T$ given in Example 1.

FIG. 5 shows a graphical representation of the acceptor A(T) above.

K-reversibility

An important aspect of the invention is determining if the HTML response structure is k-reversible. Let k be a fixed nonnegative integer. Let A=(Σ, Q, I, F, δ) be an acceptor. String u is said to be a k-follower (respectively, k-leader) of a state q in A if and only if |u|=k and δ(q, u)≠0 (respectively, $δ^r(q, u^r) \neq 0$). Note that every state has exactly one 0-follower and one 0-leader, namely, λ. The acceptor A is defined to be deterministic with lookahead k if and only if any pair of distinct states $q_1$ and $q_2$, if $q_1, q_2 \in I$ or $q_1, q_2 \in δ(q_3,a)$ for some $q_3 \in Q$ and α∈Σ, then there is no string that is a k-follower of both $q_1$ and $q_2$. This guarantees that any nondeterministic choice in the operation of A can be resolved by looking ahead k symbols past the current one.

An acceptor A is defined to be k-reversible if and only if A is deterministic and $A^r$ is deterministic with lookahead k. A language L is defined to be k-reversible if and only if there exists a k-reversible automaton A such that L=L(A). k-reversibility of attribute acceptors is defined in a similar way. An attribute acceptor A is defined to be k-reversible if and only if A is deterministic and $A^r$ is deterministic with lookahead k. An HTML response structure W is defined to be k-reversible, and a wrapper grammar may be generated, if and only if there exists a k-reversible automaton A such that W=W(A).

Attribute and prefix normalization

The requirements the positive sample set of HTML files from a given information source must satisfy the following requirements in order to make the automatic wrapper grammar inference or generation possible.

Figure 3:
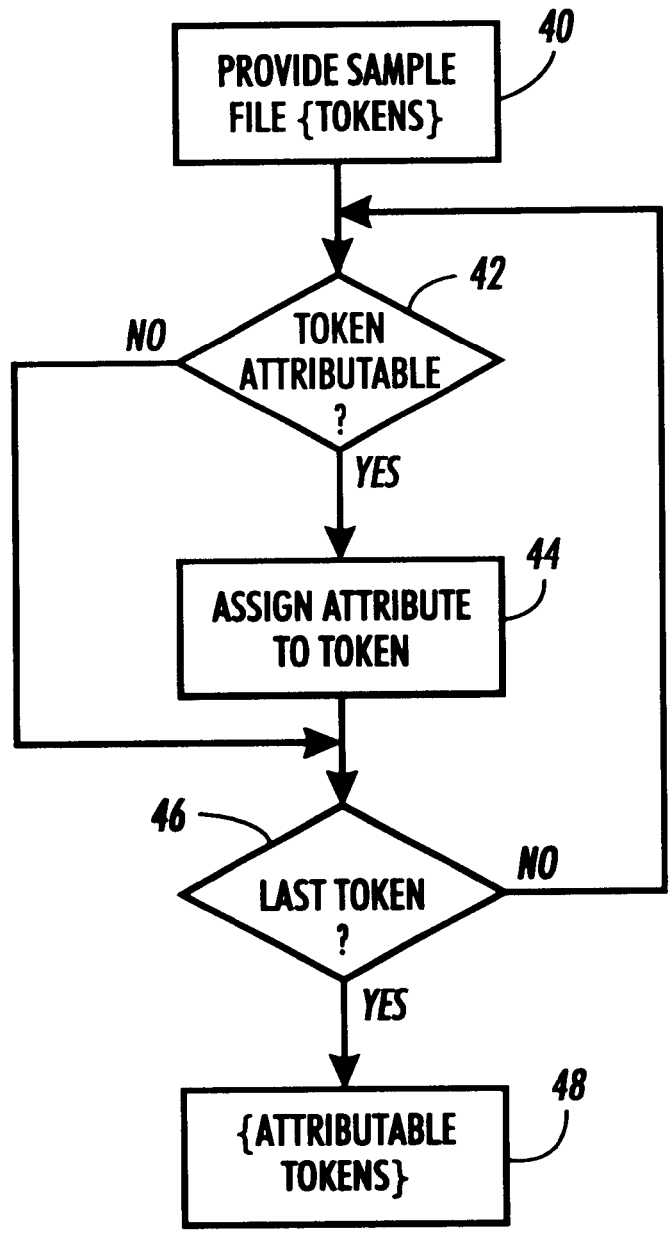
FIG. 3 is a flow chart of a method according to the invention for creating an annotated sample set.

Let S be a set of sample HTML files and $S_T$ be a set of annotated sample files. Sample HTML files may be annotated by a user or a routine that interactively queries the user for attribute names. Referring to FIG. 3, for example, a sample file comprising a set of tokens, including HTML tags and strings (step 40) is provided. Thus a sample HTML file comprises a series of none or one or more individual string tokens, s. To annotate the tokens, each token is examined to determine if it is attributable (can it be assigned to a user-defined or predetermined attribute) in step 42. If the token is attributable, it is assigned to one of the attributes in the set of attributes (step 44). If not, the next token is examined. When the last token in the file has been examined (step 46), a set of attributable tokens $S_T$ is formed (Step 48). When the string tokens have been annotated into attributes, each string s has been annotated with an attribute t from the set of attributes T. Thus, a string s'∈$S_T$ is a string s∈S that has been preprocessed by annotating all attributable tokens with attributes from T. Inversely, string s is a string s' cleaned from all labels.

Let s' be a labeled string from $S_T$ and $t_i$ be an attribute of T. If s' contain tokens $a_i, a_2, \ldots, a_n$ annotated with $t_i$, we calculate the set Pr(s', $t_i$) of reverse prefixes of $a_i$. (Note that string u is a reverse prefix of symbol a∈s if there exists a string v such that s=$u^r$av.) Then we calculate Pr($t_i$)={$\cup_{s' \in S_T}$ Pr(s', $t_i$)}, the union of all cleaned prefixes of attribute $t_i$ in the set S. The next step is to determine if all attributes in $S_T$ are distinguishable, i.e., whether the grammar S is k-reversible.

EXAMPLE 2.

Let the user attribute list T be given by two attributes Author and Title and the annotated sample set $S_T$ be given by:

$S_T$={<HTML><b>String(Author)<b>String(Title) <p><b>String(Author)<p>, <HTML><b>String (Author)<p><b>String(Author)<p>, <HTML><b>String(Author)<b>String(Title)><p>, <HTML><b>String(Author)<p>, <HTML>}.

Then the prefix of attribute Author, Pr(Author)= {<b><HTML>,<b><p>String<b>String<b><HTML>, <b><p>String<b><HTML>} and the prefix of attribute Title, Pr(Title)={<b>String<b><HTML>}.

Let $S_T$ be an annotated sample set corresponding to the above sample set S. Two distinct attributes $t_i$ and $t_j$ of T are called distinguishable in $S_T$ if Pr($t_i$)∩Pr($t_j$)=φ.

Theorem 1.

Let T be an attribute list and $S_T$ be an annotated sample set. There exists a deterministic attribute acceptor for set $S_T$ if and only if any pair of attributes of T is indistinguishable in $S_T$. Theorem 1 indicates that if all attributes in the annotated sample set $S_T$ are distinguishable, then the grammar is k-reversible, the wrapper grammar generation can be done automatically and all attributes will be properly recognized.

Alternatively, if two or more attributes are indistinguishable, it does not necessarily mean a partial wrapper grammar cannot be generated. In many practical situations, an automatically generated partial wrapper grammar can be sufficient to meet the user's needs. A partial wrapper grammar is generated for all other distinguishable attributes (excluding only those indistinguishable attributes). This is a significant advantage.

To allow partial wrapper grammar generation, the attribute set is normalized, that is, each group of indistinguishable attributes is merged into one joint attribute. (As noted above, if some information provider or source links Journal and Volume in the same string, these will be combined into a single attribute called Reference.)

If d is a subset of T, we define a reverse prefix set of d as the union of reverse prefix sets of attributes in d, Pr(d)=$\cup_{t_i \in d}$ Pr($t_i$). Then the attribute normalization is a partition π of the attribute set T into equivalence classes $d_1, d_2, \ldots$ such that T=$\cup_i d_i$ and Pr($d_i$)∩Pr($d_j$)=φ, where i≠j, that is no two classes have common reverse prefixes. Once the partition π is done, we obtain all equivalence classes $d_i$ that are distinguishable for the automatic wrapper grammar generation.

The following are some important cases of attribute normalization:

If all attributes are distinguishable, then $d_i=\{t_i\}$. This means the wrapper grammar can be completely generated.

If $d_1=T$, then all attributes are indistinguishable and no partial parser can be generated automatically. This means the wrapper grammar cannot be generated at all.

If an equivalence class $d_i$ contains an attribute $t_i$ and $t_0$=void, attribute $t_i$ is consumed by void and cannot be recognized in response files and must be excluded from the wrapper grammar.

The attribute normalization partitions all user attributes of T into classes based on reverse prefix equivalence. The partition π of the attribute set $T=\{t_i\}$ is denoted as the normalized attribute set $T'=\{d_i\}$. Partial wrapper grammar generation is possible with some merged attributes.

Reversibility index k

The reversibility index k is a measure of the complexity of the HTML file. For example, if the HTML files are relatively simple (such as in Example 1), then the value of k is small (the smallest value is 1). In more complex HTML files, the value of k may be larger: 2, 3 or more. Small values of k are preferable from a performance point of view, because they make the grammar shorter and the processing (parsing) faster. However larger values of k mean the wrapper grammar is more complex and more information can be extracted.

Once a normalized partition of the attribute set has been created, no two classes (attributes) in T' have any common reverse prefix. Let $t_i$ and $t_j$ be two attributes in T'. For a string s∈S, the leading k characters of s is called a k-prefix and denoted by s [k]. If len(s)<k, s[k]=s, where len(s) is the length of string s. Given the set Pr($t_i$) of reverse prefixes of attribute $t_i$∈T', the set $Pr_k(t_i)=\{s[k]|s\in Pr(t_i)\}$ is called a k-prefix set of the attribute $t_i$.

For two distinct attributes $t_i$ and $t_j$, the minimal joint index between $t_i$ and $t_j$ is given by $k(i, j)=\min\{k|Pr_k(t_i)\cap Pr_k(t_j)\}=\phi$.

EXAMPLE 3.

For the example set given in Example 2 above, we obtain the prefixes of attributes Author and Title: Pr(Author)= {<b><HTML>, <b><p>String<b>String<b><HTML>, <b><p>String<b><HTML>} and Pr(Title)= {<b>String<b><HTML>}. Then the minimal joint index k between Author and Title is given by: k(Author, Title)=2. Indeed, if the prefix of Author is given by $Pr_2$(Author)= {<b><HTML>,<b><p>} and the prefix of Title is given by $Pr_2$(Title)={<b>String}, then for these definitions of Author and Title, $Pr_2$(Author)∩$Pr_2$(Title)=φ. Instead, for k =1, $Pr_1$(Author)∩$Pr_1$(Title)={<b>}≠φ. Thus the wrapper grammar given by Example 2 is 2-reversible and not 1-reversible. This means the wrapper grammar must search k=2 symbols past the current one for a deterministic result. For the whole attribute set T', we calculate a minimal reversibility index for all pairs of attributes, we can similarly calculate a common index for all attributes: $k(T')=\min\{k|\forall i,j:t_i,t_j\in T',Pr_k(t_i)\cap Pr_k(s_j)\}=\phi\}$. The value k(T') indicates the reversibility index of the regular language corresponding to attribute set T' obtained by the normalization of the annotated sample set $S_T$.

Wrapper grammar generation (induction)

Given a reversibility index k obtained in the previous section, we can infer a k-reversible attribute acceptor by applying the definition described above. Starting from the prefix tree acceptor $A_0=PA(S_T)$, we generate acceptors $A_1$, $A_2$, . . . by merging the states which violate the k-reversibility conditions. When no pair of states is found to violate these conditions, the result is a final attribute k-reversible acceptor for the sample set $S_T$.

More precisely, let $S_T$ be the set of annotated sample files and $A_0=(\Sigma, Q_0, I_0, F_0, \delta_0)$ be a prefix tree acceptor constructed for $S_T$. Induction with the reversibility index k is a recursive construction of the attribute acceptor Ai+1 from the attribute $A_{i+1}$ by merging two states $q_1$ and $q_2$ such that either 1. for some a∈Σ and state $q_3$, states $q_1$ and $q_2$ are both a-successors of $q_3$, or 2. $q_1$ and $q_2$ have a common k-leader and either $q_1$ and $q_2$ are both final states, or there exists state $q_3$ and a symbol a∈Σ such that $q_3$ is an a-successor of both $q_1$ and $q_2$.

EXAMPLE 4.

Figure 6C:
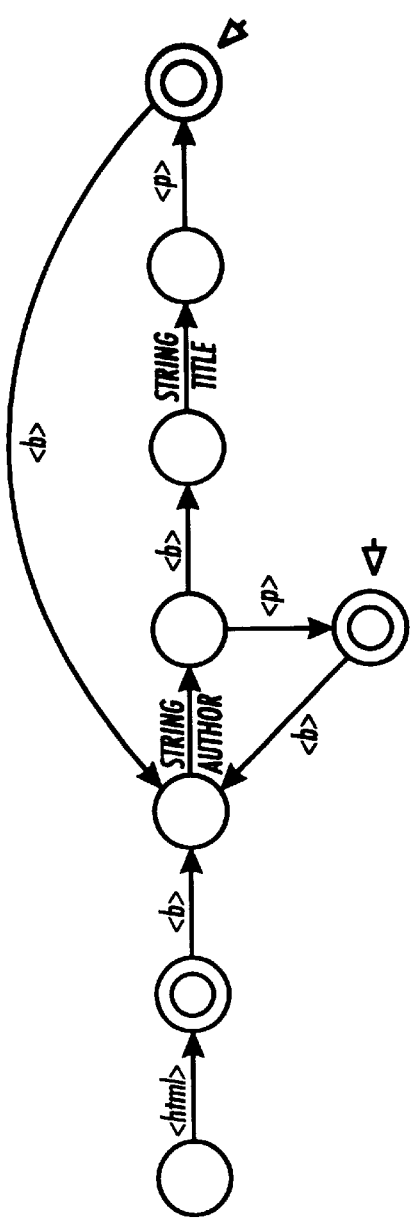
Figure 6D:
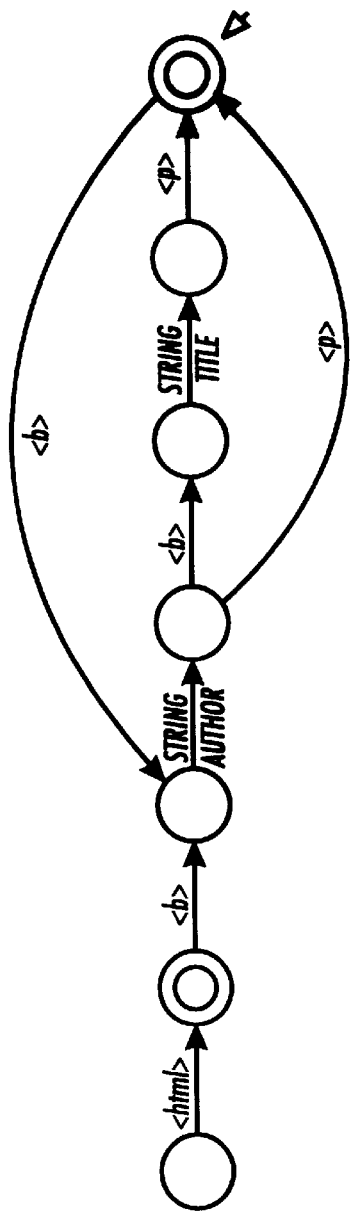

For the annotated sample set given in Example 2, FIG. 6a shows the initial prefix tree acceptor. Then FIGS. 6b–6d show the merge steps conducted by the 2-reversibility of the attribute acceptor. Merged states at each step are indicated by arrows. Note the final attribute acceptor in FIG. 6d is equivalent to the acceptor in FIG. 1.

Figure 4:
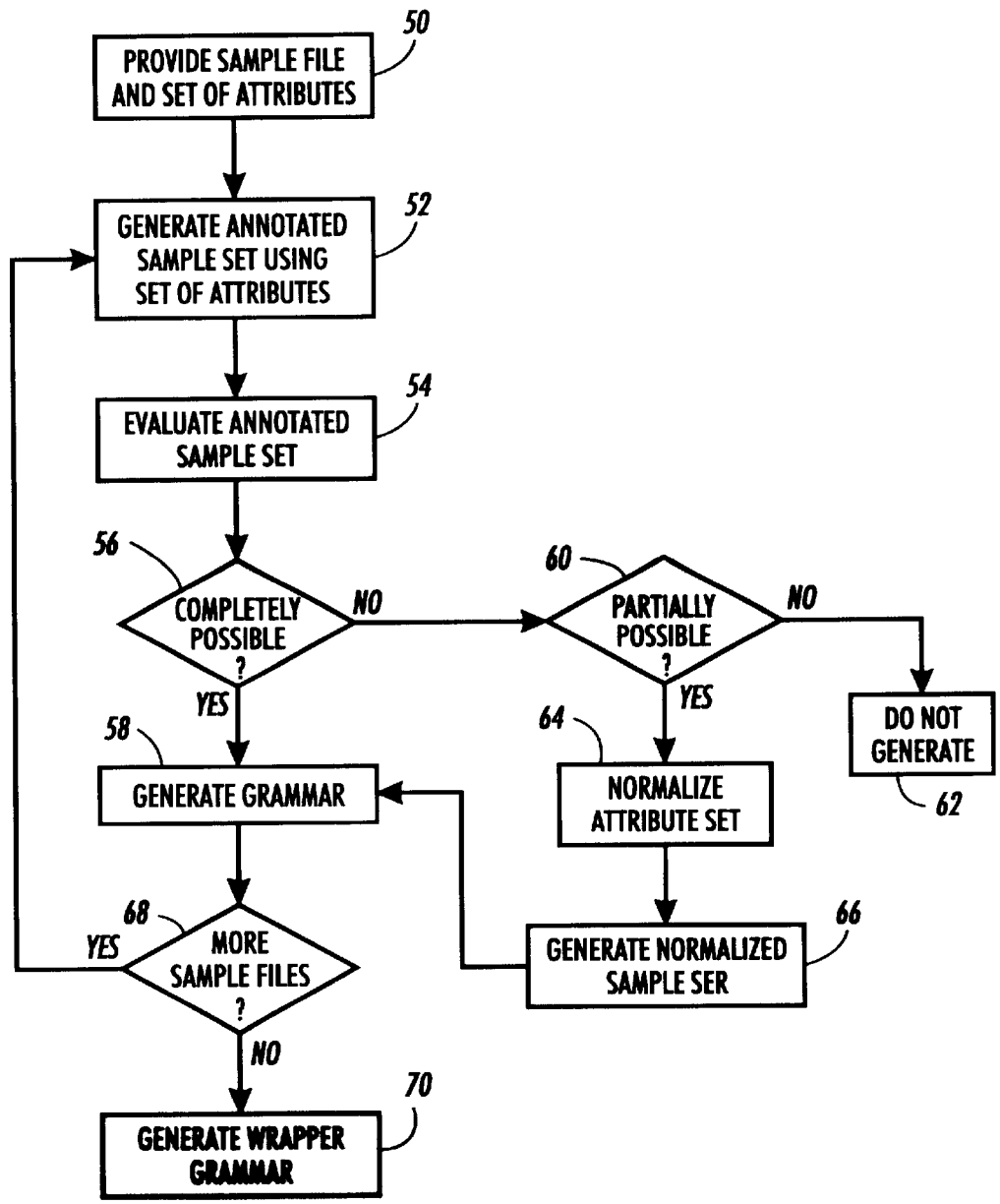
FIG. 4 is a flow chart of a method according to the invention for generating a wrapper grammar.

Referring to FIG. 4, the method for automatic wrapper grammar generation can be described as a sequence of steps to be performed. Prove a set of sample HTML files of a particular format and a set of user selected or predetermined attributes (step 50). Preprocess the set of sample HTML files by annotating attributable tokens by attributes from the attribute set $T=\{d_0$=void, $t_1,t_2$ . . . } to form an annotated sample set (step 52). Evaluate the annotated sample set (step 54) to determine if wrapper grammar generation is possible. To accomplish this, create the prefix sets Pr($t_i$) for all attributes $t_i$∈T. Construct the attribute partition π of T, $T'=\{d_i\}$. Then, check if wrapper grammar generation is completely possible (step 56). If |T'|=|T|, the complete wrapper can be generated automatically and continue to generate the wrapper grammar (step 58). Then check if partial grammar generation is possible (step 60). If the obtained partition contains one class, |T'|=1, the wrapper cannot be generated automatically (step 62). If 1 <|T'|<|T|, a partial wrapper can be generated automatically. Normalize the attribute set (step 64). If 1<|T'|, calculate the minimal reversibility index k for T'. Construct the prefix tree acceptor $A_0$ and induce the k-reversibility attribute acceptor from the sample set $S_T$. Generate the normalized sample set (step 66) and generate the wrapper grammar (step 58).

Note that if any equivalence class $d_i$ contains attribute $t_0$=void and $t_i$, i>0, attribute $t_i$ is consumed by void attribute and cannot be recognized in the automatic wrapper generation. If there are additional HTML sample files (step 68) the method loops back to step 52. If not, a wrapper grammar is generated (step 70). The attribute acceptor generated by the method corresponds to a regular grammar that accepts responses from the information provider and assigns the tokens to the user attributes.

Incremental attribute acceptor

The method of automatic wrapper grammar generation is incremental. First, it does not require all grammatical particularities of the source responses to appear in the initial sample set. The attribute acceptor that will be generated from such an incomplete sample set will accept the sample files as well as all responses having the same (incomplete) structure. Second, each time a response from the source contains a grammatical element not appeared in previous samples, the method would upgrade the acceptor following the same procedure used for the initial sample set. If the difference does not contain any attributable tokens, the upgrade will be mute; otherwise the designer will be asked to annotate the attributable tokens in order to update the annotated sample set. Note that new grammatical elements in the response files can result in recalculation of some prefix values or even converting some distinguishable user attributes into indistinguishable.

The method of the invention that employs learning from samples marked by the wrapper grammar designer (for example) turns out to be more efficient than the rigid schemes used in other approaches. Analysis of 21 HTML wrapper grammars shows that all of them can be covered by k-reversible grammars, with 1-reversible grammar in 12 cases, 2-reversible grammars in 8 cases and 3-reversible grammar in 1 case.

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for generating a wrapper grammar for a file having a structure of a particular format, comprising:
   providing at least one sample file of the particular format, wherein the particular format comprises a plurality of string tokens;
   processing the at least one sample file of the particular format by annotating attributable tokens with attributes from a set of attributes, wherein a token is attributable if it can be assigned to an attribute, to generate an annotated sample set;
   evaluating the annotated sample set to determine if automatic wrapper grammar generation is possible by determining if all attributes in the annotated sample set are distinguishable from one another; and
   if automatic wrapper grammar generation is possible, generating a wrapper grammar for the files having a structure of the particular format.

2. The method of claim 1, wherein the step of determining if all attributes $t_i$ are distinguishable comprises:
   generating a set of reverse prefixes for each attribute $t_i$;
   partitioning the attribute set into equivalence classes $d_i$, wherein no two equivalence classes have common reverse prefixes; and
   if the equivalence classes are equal to the attributes, $d_i = t_i$, then all attributes $t_i$ are distinguishable.

3. The method of claim 2, wherein if there is only one equivalence class d1 and d1 is equal to the set of attributes, then the wrapper grammar cannot be generated.

4. The method of claim 1, wherein the file having a structure of a particular format comprises an HTML file.

5. The method of claim 1, wherein the file having a structure of a particular format comprises an ODBC-compliant file.

6. The method of claim 1, wherein the file having a structure of a particular format comprises a DMA-compliant file.

7. The method of claim 1, further comprising:
   providing a second sample of the particular format;
   processing the second sample file by annotating attributable tokens with new attributes from the set of attributes to generate a second annotated sample set;
   evaluating the second annotated sample set to determine if wrapper generation is possible; and
   if wrapper generation is possible, generating an incremental wrapper grammar.

8. The method of claim 2, wherein if an equivalence class $d_i$ contains an attribute $t_i$ and $t_0$=void, attribute $t_i$ is consumed by void and cannot be recognized in response files.

9. The method of claim 3, wherein if some of the equivalence classes are equal to the attributes, $d_i = t_i$, then some attributes $t_i$ are distinguishable and the wrapper grammar may be partially generated.

10. The method of claim 9, further comprising normalizing the set of distinguishable attributes and generating a wrapper grammar based on the set of normalized set of attributes.

11. A method for generating a wrapper for an HTML file having a structure of a particular format, comprising:
   providing at least one sample HTML file of the particular format, wherein the particular format comprises a plurality of string tokens;
   processing the at least one sample HTML file of the particular format by annotating attributable tokens with attributes from a set of attributes, wherein a token is attributable if it can be assigned to an attribute, to generate an annotated sample set;
   evaluating the annotated sample set to determine if wrapper generation is possible by determining if all attributes in the annotated sample set are distinguishable from one another; and
   if wrapper generation is possible, generating a wrapper for the HTML files having a structure of the particular format.

12. A system for generating a wrapper for a file having a structure of a particular format, comprising:
   a memory storing at least one sample file of the particular format, wherein the particular format comprises a plurality of string tokens; and
   a processor for processing the at least one sample file of the particular format by annotating attributable tokens with attributes from a set of attributes, wherein a token is attributable if it can be assigned to an attribute, to generate an annotated sample set; for evaluating the annotated sample set to determine if wrapper generation is possible by determining if all attributes in the annotated sample set are distinguishable from one another; and if wrapper generation is possible, generating a wrapper for the files having a structure of the particular format.

13. The system of claim 12, wherein processor determines if all attributes $t_i$ are distinguishable by:
   generating a set of reverse prefixes for each attribute $t_i$;
   partitioning the attribute set into equivalence classes $d_i$, wherein no two equivalence classes have common reverse prefixes; and if the equivalence classes are equal to the attributes, $d_i=t_j$, then all attributes $t_j$ are distinguishable.

14. The system of claim 13, wherein if there is only one equivalence class $d_1$ and $d_i$ is equal to the set of attributes, then the wrapper grammar cannot be generated.

15. The system of claim 13, wherein if an equivalence class $d_i$ contains an attribute $t_1$ and $t_0$=void, attribute $t_j$ is consumed by void and cannot be recognized in response files.

16. The system of claim 13, wherein if some of the equivalence classes are equal to the attributes, $d_i=t_j$, then some attributes $t_j$ are distinguishable and the wrapper grammar may be partially generated.

17. The system of claim 16, wherein the processor normalized the set of distinguishable attributes and generates a wrapper grammar based on the set of normalized set of attributes.

18. An article of manufacture for use in a system that includes a processor for accessing data on a storage medium using a storage medium access device, comprising:

a storage medium; and instruction data stored on the storage medium, the instruction data defining a sequence of instructions for access by the processor using the storage medium access device, wherein the sequence of instructions comprises:

providing at least one sample file of the particular format, wherein the particular format comprises a plurality of string tokens;

processing the at least one sample file of the particular format by annotating attributable tokens with attributes from a set of attributes, wherein a token is attributable if it can be assigned to an attribute, to generate an annotated sample set;

evaluating the annotated sample set to determine if wrapper grammar generation is possible by determining if all attributes in the annotated sample set are distinguishable from one another; and if wrapper grammar generation is possible, generating a wrapper grammar for the files having a structure of the particular format.

* * * * *